United States Patent
Oota

(10) Patent No.: US 10,777,819 B2
(45) Date of Patent: Sep. 15, 2020

(54) COMPOSITION FOR LITHIUM SECONDARY BATTERY ELECTRODES

(71) Applicant: SEKISUI CHEMICAL CO., LTD., Osaka (JP)

(72) Inventor: Ayako Oota, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 57 days.

(21) Appl. No.: 16/082,720

(22) PCT Filed: Mar. 30, 2017

(86) PCT No.: PCT/JP2017/013324
§ 371 (c)(1),
(2) Date: Sep. 6, 2018

(87) PCT Pub. No.: WO2017/170898
PCT Pub. Date: Oct. 5, 2017

(65) Prior Publication Data
US 2019/0074517 A1 Mar. 7, 2019

(30) Foreign Application Priority Data
Apr. 1, 2016 (JP) .................. 2016-074770

(51) Int. Cl.
H01M 4/62 (2006.01)
H01M 4/13 (2010.01)
C08F 18/08 (2006.01)
H01M 4/131 (2010.01)
H01M 10/0525 (2010.01)
C08F 8/28 (2006.01)
H01M 4/525 (2010.01)

(52) U.S. Cl.
CPC ............ H01M 4/622 (2013.01); C08F 18/08 (2013.01); H01M 4/13 (2013.01); H01M 4/131 (2013.01); H01M 4/62 (2013.01); H01M 10/0525 (2013.01); C08F 8/28 (2013.01); H01M 4/525 (2013.01)

(58) Field of Classification Search
CPC ................................ H01M 4/622; H01B 1/20
USPC ......................................... 429/211; 252/500
See application file for complete search history.

(56) References Cited

U.S. PATENT DOCUMENTS

| 2006/0121350 A1 | 6/2006 | Kajiya et al. |
| 2012/0321963 A1 | 12/2012 | Fujioka et al. |
| 2013/0175482 A1 | 7/2013 | Schulz-Dobrick |
| 2013/0197154 A1 | 8/2013 | Yamaguchi et al. |
| 2014/0045054 A1 | 2/2014 | Komaba et al. |
| 2015/0240018 A1 | 8/2015 | Nagai |
| 2017/0018778 A1 | 1/2017 | Nagai |

FOREIGN PATENT DOCUMENTS

| CN | 100413125 | 8/2008 | | |
| JP | 2001-089520 | 4/2001 | | |
| JP | 2006-169503 | 6/2006 | | |
| JP | 2007-265731 | 10/2007 | | |
| JP | 2008-050412 | 3/2008 | | |
| JP | 2012-195289 | 10/2012 | | |
| JP | 2012-216488 A | * | 11/2012 | ............... H01B 1/20 |
| JP | 2013-048043 | 3/2013 | | |
| JP | 2013-178962 | 9/2013 | | |

(Continued)

OTHER PUBLICATIONS

International Search Report dated Jun. 13, 2017 in International (PCT) Application No. PCT/JP2017/013324.
Extended European Search Report dated Nov. 4, 2019 in corresponding European Application No. 17775432.2.
International Search Report dated Jun. 21, 2016 in International (PCT) Application No. PCT/JP2016/058717.
International Preliminary Report on Patentability dated Sep. 26, 2017 in International (PCT) Application No. PCT/JP2016/058717.
Extended European Search Report dated Oct. 18, 2018 in European Application No. 16768686.4.
Non-Final Office Action dated Jul. 1, 2019 in U.S. Appl. No. 15/558,436.

Primary Examiner — Khanh T Nguyen
(74) Attorney, Agent, or Firm — Wenderoth, Lind & Ponack, L.L.P.

(57) ABSTRACT

The present invention aims to provide a composition for a lithium secondary battery electrode which is excellent in dispersibility of an active material and adhesiveness, capable of maintaining an appropriate viscosity for a long period of time, and capable of providing a high-capacity lithium secondary battery even when the amount of a binder is small. Provided is a composition for a lithium secondary battery electrode including: an active material; a polyvinyl acetal resin; and an organic solvent, the polyvinyl acetal resin having a structural unit having a hydroxyl group represented by the following formula (1), a structural unit having an acetal group represented by the following formula (2), and a structural unit having a carboxyl group, the polyvinyl acetal resin containing 45 to 95 mol % of the structural unit having a hydroxyl group represented by the following formula (1):

$$-\!\!\!\!+\!CH_2-CH\!+\!\!\!\!-\atop\phantom{xx}|\phantom{xx}\atop\phantom{xx}OH} \quad, \tag{1}$$

$$-\!\!\!\!+\!CH_2-CH-CH_2-CH\!+\!\!\!\!-\atop\phantom{xx}|\phantom{xxxxxxxx}|\atop\phantom{xx}O\phantom{xxxxxx}O\atop\phantom{xxxxx}\diagdown\!\!\diagup\atop\phantom{xxxxxx}CH\atop\phantom{xxxxxx}|\atop\phantom{xxxxxx}R^1} \quad, \tag{2}$$

where $R^1$ represents a hydrogen atom or a C1-C20 alkyl group.

16 Claims, No Drawings

(56) References Cited

FOREIGN PATENT DOCUMENTS

| | | |
|---|---|---|
| JP | 2013-179040 | 9/2013 |
| JP | 2014-135198 | 7/2014 |
| JP | 2014-224221 | 12/2014 |
| JP | 5708872 | 4/2015 |
| JP | 2015-88487 | 5/2015 |
| JP | 2015-115289 | 6/2015 |
| JP | 2015-141883 | 8/2015 |
| JP | 2015-179631 | 10/2015 |
| WO | 2011/087029 | 7/2011 |
| WO | 2012/133034 | 10/2012 |
| WO | 2014/050795 | 4/2014 |
| WO | 2015/146747 | 10/2015 |

* cited by examiner

COMPOSITION FOR LITHIUM SECONDARY BATTERY ELECTRODES

TECHNICAL FIELD

The present invention relates to a composition for a lithium secondary battery electrode which is excellent in dispersibility of an active material and adhesiveness, capable of maintaining an appropriate viscosity for a long period of time, and capable of providing a high-capacity lithium secondary battery even when the amount of a binder is small.

BACKGROUND ART

With the recent spread of mobile electronic devices such as mobile video cameras and mobile PCs, demand for secondary batteries as a portable power source is rapidly increasing. In addition, with respect to such secondary batteries, there is a great need for achieving downsizing, weight reduction, and enhanced energy density.

Conventionally, aqueous batteries such as lead batteries and nickel-cadmium batteries have been mainly used as secondary batteries which can be repeatedly charged and discharged. Though these aqueous solution-based batteries have excellent charge/discharge characteristics, they do not sufficiently satisfy the properties as a portable power source for a mobile electronic device in terms of the battery weight and energy density.

Lithium secondary batteries including a negative electrode made of lithium or a lithium alloy have been thus intensively studied and developed as secondary batteries. The lithium secondary batteries have excellent properties such as high energy density, less self-discharge, and light weight.

An electrode of a lithium secondary battery is commonly prepared as follows. An active material and a binder are kneaded together with a solvent so that the active material is dispersed, thereby preparing a slurry. The slurry is applied to a current collector by the doctor blade method or the like, and dried to form a thin film as an electrode.

At the present, a fluororesin typified by polyvinylidene fluoride (PVDF) is most widely used as a binder for an electrode of a lithium secondary battery.

In the case of using a fluororesin as a binder, though a flexible thin film can be prepared, binding between a current collector and an active material is poor. Due to this, the active material may partially or entirely be detached or fall off during a process of producing a battery. Moreover, upon charge and discharge of the battery, insertion and release of lithium ions are repeated in the active material. Due to this phenomenon, the active material may be detached or fall off from the current collector.

To solve such a problem, a binder other than PVDF has been tried to be used. In the case of using a conventional resin, however, decomposition or deterioration of the resin may occur upon application of a voltage to an electrode. When the resin is decomposed or deteriorated, the charge/discharge capacity may be lowered and the electrode may be detached.

To overcome such a situation, Patent Literature 1 discloses a binder for a non-aqueous secondary battery which includes a copolymer prepared from an acidic functional group-containing monomer and an amide group-containing monomer.

In the case of using such a binder, however, the dispersibility of an active material is lowered and the viscosity of the resulting composition for an electrode increases. In such a case, paste filtration takes time to prolong the preparation time and coating unevenness is likely to be developed upon application of the composition. In addition, since the active material density in the electrode is lowered, the capacity of the resulting battery is insufficient.

Moreover, the use of such a resin lowers the flexibility of the resulting electrode to cause cracking or peeling thereof from the current collector, leading to poor battery durability.

Patent Literature 2 discloses a composition of a binder for a secondary battery positive electrode containing an aromatic vinyl unit, a nitrile group unit, a hydrophilic group unit, and a linear alkylene unit each in a predetermined amount.

Even in the case of using such a composition, the dispersibility of an active material is lowered and the viscosity of the resulting composition for an electrode increases. Accordingly, paste filtration takes time to prolong the preparation time and coating unevenness is likely to be developed upon application of the composition. In particular, an increase in the viscosity is significant when the time has passed after preparation of the composition for an electrode.

In addition, since the active material density in the electrode is lowered, the capacity of the resulting battery is insufficient.

CITATION LIST

Patent Literature

Patent Literature 1: JP 5708872 B
Patent Literature 2: JP 2013-179040 A

SUMMARY OF INVENTION

Technical Problem

The present invention aims to provide a composition for a lithium secondary battery electrode which is excellent in dispersibility of an active material and adhesiveness, capable of maintaining an appropriate viscosity for a long period of time, and capable of providing a high-capacity lithium secondary battery even when the amount of a binder is small.

Solution to Problem

The present invention relates to a composition for a lithium secondary battery electrode including: an active material; a polyvinyl acetal resin; and an organic solvent, the polyvinyl acetal resin having a structural unit having a hydroxyl group represented by the following formula (1), a structural unit having an acetal group represented by the following formula (2), and a structural unit having a carboxyl group, the polyvinyl acetal resin containing 45 to 95 mol % of the structural unit having a hydroxyl group represented by the following formula (1).

The present invention is specifically described in the following.

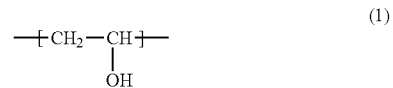
(1)

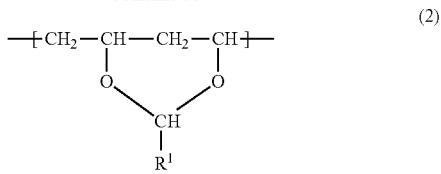

(2)

In the formula (2), $R^1$ represents a hydrogen atom or a C1-C20 alkyl group.

The present inventors made intensive studies to find out that, when containing a polyvinyl acetal resin having a predetermined structural unit, a composition for forming a lithium secondary battery electrode has excellent dispersibility of an active material and adhesiveness, capable of maintaining an appropriate viscosity for a long period of time, and capable of producing a high-capacity lithium secondary battery even when the amount of a binder is small.

The composition for a lithium secondary battery electrode of the present invention contains an active material.

The composition for a lithium secondary battery electrode of the present invention may be used for a positive electrode or a negative electrode, or it may be used for both a positive electrode and a negative electrode. Accordingly, examples of a usable active material include positive electrode active materials and negative electrode active materials.

Examples of the positive electrode active materials include lithium-containing composite metal oxides such as lithium nickel oxides, lithium cobalt oxides, and lithium manganese oxides. Specific examples thereof include $LiNiO_2$, $LiCoO_2$, and $LiMn_2O_4$.

These may be used alone, or in combination of two or more thereof.

The negative electrode active material used may be a negative electrode active material conventionally used for a lithium secondary battery, and examples thereof include spherical natural graphite, natural graphite, artificial graphite, amorphous carbon, carbon black, and those obtained by adding a foreign element to these.

The composition for a lithium secondary battery electrode of the present invention preferably contains a conductivity imparting agent (conductive aid).

Examples of the conductivity imparting agent include graphite, acetylene black, carbon black, Ketjenblack, and vapor-grown carbon fiber. In particular, the conductivity imparting agent used for a positive electrode is preferably acetylene black or carbon black, while the conductivity imparting agent used for a negative electrode is preferably acetylene black or scaly graphite.

The composition for a lithium secondary battery electrode of the present invention contains a polyvinyl acetal resin. In the present invention, the use of a polyvinyl acetal resin as a binder (a binding agent) causes an attractive interaction between a hydroxyl group of the polyvinyl acetal resin and an oxygen atom of the positive electrode active material, leading to a structure in which the polyvinyl acetal resin surround the positive electrode active material. In addition, another hydroxyl group in the same molecule has an attractive interaction with the conductivity imparting agent to keep the distance between the active material and the conductivity imparting agent within a predetermined range. Such a characteristic structure in which the distance between the active material and the conductivity imparting agent is kept within a specific range remarkably improves the dispersibility of the active material. In comparison with the case where a resin such as PVDF is used, the adhesion to the current collector can be improved. Moreover, the solvent solubility is excellent to advantageously widen the range of solvent selection.

The polyvinyl acetal resin has a structural unit having a hydroxyl group represented by the above formula (1), a structural unit having an acetal group represented by the above formula (2), and a structural unit having a carboxyl group.

The polyvinyl acetal resin having these structural units advantageously has excellent resistance to an electrolyte, adhesion to a current collector, and ion conductivity and is capable of producing a high-capacity lithium ion battery even when the amount of a binder is small.

In addition, even after a lapse of time, for example, after storage for a long period of time, the viscosity is not likely to increase, which contributes to excellent handleability.

The polyvinyl acetal resin has a structural unit having a hydroxyl group represented by the above formula (1).

In the polyvinyl acetal resin, the lower limit of the amount of the structural unit having a hydroxyl group represented by the formula (1) (hydroxyl group content) is 45 mol %, and the upper limit thereof is 95 mol %. With the hydroxyl group content of 45 mol % or higher, the resistance against an electrolyte can be improved to prevent elution of the resin into the electrolyte. With the hydroxyl group content of 95 mol % or lower, the resin has better flexibility to ensure sufficient adhesion to a current collector.

The lower limit of the hydroxyl group content is preferably 45 mol %, and the upper limit thereof is preferably 80 mol %.

The polyvinyl acetal resin has a structural unit having an acetal group represented by the above formula (2).

The amount of the structural unit having an acetal group represented by the formula (2) (degree of acetalization) in the polyvinyl acetal resin is preferably 20 to 55 mol %. With the degree of acetalization of 20 mol % or higher, the solubility of the resin in a solvent is improved, and the resin is favorably used as a component of a composition. When the degree of acetalization is 55 mol % or lower, the resistance against an electrolyte is enough to prevent elution of resin components into the electrolyte when the resulting electrode is immersed in the electrolyte. The degree of acetalization is more preferably 30 to 55 mol %.

The degree of acetalization as used herein refers to the proportion of the number of hydroxyl groups acetalized with butyraldehyde to the number of hydroxyl groups in the polyvinyl alcohol. Since an acetal group of the polyvinyl acetal resin is formed by acetalization of two hydroxyl groups, the degree of acetalization (mol %) can be calculated by counting the unit of acetalized two hydroxyl groups.

The structural unit having an acetal group represented by the formula (2) can be obtained by acetalization with an aldehyde.

The lower limit of the carbon number of the aldehyde (the number of carbons excluding the aldehyde group) is preferably 1, and the upper limit thereof is preferably 11. With the carbon number within the above range, the resin has lower hydrophobicity to have better purification efficiency, leading to reduction of the Na ion content.

Specific examples of the aldehyde include acetaldehyde, butyraldehyde, benzaldehyde, propionaldehyde, and aldehydes having a vinyl group (vinyl aldehydes) such as acrolein.

The acetal group represented by the formula (2) is preferably at least one selected from the group consisting of a butyral group, a benzacetal group, an acetoacetal group, a propionacetal group, and a vinyl acetal group.

In the formula (2), $R^1$ represents a hydrogen atom or a C1-C20 alkyl group, and preferably represents a C1 alkyl group or a C3 alkyl group.

The polyvinyl acetal resin in which $R^1$ is a C1 alkyl group or a C3 alkyl group is obtained by acetalization with acetaldehyde or butyraldehyde.

In the polyvinyl acetal resin, the ratio of a portion acetalized with acetaldehyde to a portion acetalized with butyraldehyde is preferably 0/100 to 50/50. With this structure, the polyvinyl acetal resin is soft to have favorable adhesion to a current collector. The ratio of the portion acetalized with acetaldehyde to the portion acetalized with butyraldehyde is more preferably 0/100 to 20/80.

The polyvinyl acetal resin has the structural unit having a carboxyl group.

With the structural unit having a carboxyl group, the polyvinyl acetal resin is less likely to suffer an increase in the viscosity even after a lapse of time, for example, after storage for a long period of time, so as to advantageously have excellent handleability.

In addition, the polarity of the resin increases to improve the solvent resistance against an electrolyte, preventing elution of the polyvinyl acetal resin in the electrolyte. Moreover, the improvement of the solvent resistance reduces electrode defect after production of a battery, leading to improvement of the battery capacity and cycle characteristics.

The structural unit having a carboxyl group includes a structural unit having, as a carboxyl group, a salt of a carboxyl group, in addition to one having a carboxyl group. Examples of the salt of a carboxyl group include sodium salt.

The structural unit having a carboxyl group is preferably a structural unit having at least one selected from structural units having a carboxyl group represented by the following formulae (3), (4), and (5).

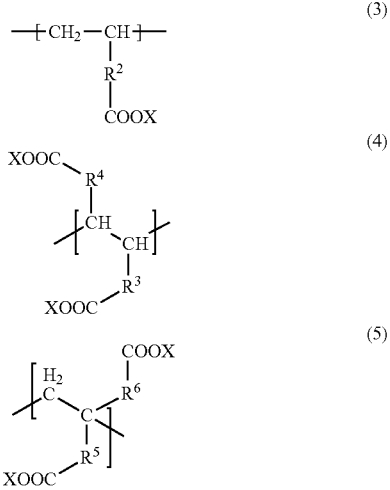

In the formulae (3), (4), and (5), $R^2$, $R^3$, $R^4$, $R^5$, and $R^6$ each represent a single bond or a C1-C10 saturated or unsaturated hydrocarbon, and X represents hydrogen, sodium, or potassium.

When the structural units having a carboxyl group represented by the formulae (3), (4), and (5) each have a structure in which the carboxyl group is bonded to the main chain through a saturated or unsaturated hydrocarbon, the reactivity between a carboxyl group-containing monomer and vinyl acetate is high, and therefore, the amount of carboxyl modified groups in the molecule can be increased. Moreover, the carboxyl group is less likely to be influenced by the main chain because of the bonding thereof through the saturated or unsaturated hydrocarbon. $R^2$, $R^3$, $R^4$, $R^5$, and $R^6$ each are preferably a C1-C10 saturated or unsaturated hydrocarbon.

$R^2$, $R^3$, $R^4$, $R^5$, and $R^6$ each are a single bond or a C1-C10 saturated or unsaturated hydrocarbon. Examples of $R^2$, $R^3$, $R^4$, $R^5$, and $R^6$ include linear or branched alkylene groups and arylene groups. $R^2$, $R^3$, $R^4$, $R^5$, and $R^6$ may be the same as or different from one another.

The alkylene group is preferably a linear alkylene group, and preferably a C1-C6 alkylene group. In particular, preferred are a methylene group, an ethylene group, and a propylene group.

X is preferably hydrogen or sodium.

The lower limit of the amount of the structural unit having a carboxyl group in the polyvinyl acetal resin is preferably 0.01 mol % and the upper limit thereof is preferably 5 mol %. When the amount of the structural unit having a carboxyl group is 0.01 mol % or more, the temporal stability of an electrode paste can be maintained. When the amount of the structural unit having a carboxyl group is 5 mol % or less, the solubility in an organic solvent is improved to prevent an increase in the viscosity of the paste. The lower limit of the amount is more preferably 0.05 mol % and the upper limit thereof is more preferably 4 mol %.

The ratio of the amount of the structural unit having a hydroxyl group and the amount of the structural unit having a carboxyl group (amount of structural unit having a hydroxyl group:amount of structural unit having a carboxyl group) in the polyvinyl acetal resin is preferably 5:1 to 99990:1. With the ratio within the above range, the polyvinyl acetal resin maintains a steric structure that facilitates point contact with a conductive material such as an active material and a conductive aid, improving the battery characteristics. The ratio is more preferably 9:1 to 9999:1.

The polyvinyl acetal resin preferably has a structural unit having an acetyl group represented by the following formula (6).

In the polyvinyl acetal resin, the lower limit of the amount of the structural unit having an acetyl group represented by the following formula (6) (acetyl group content) is preferably 0.1 mol %, and the upper limit thereof is preferably 30 mol %. When the acetyl group content is 0.1 mol % or higher, the resin has better flexibility to ensure sufficient adhesion to a current collector. When the acetyl group content is 30 mol % or lower, the resistance against an electrolyte is improved to prevent short circuit caused by elution of the resin into the electrolyte. The lower limit of the acetyl group content is more preferably 0.3 mol %, and the upper limit thereof is more preferably 20 mol %.

In the present invention, the structural unit having a carboxyl group represented by the formula (3), (4), or (5) and the structural unit having an acetyl group represented by the formula (6) both have a carbonyl group. Accordingly, when the polyvinyl acetal resin has these two structural units, an increase in the viscosity during storage for a long period of time can be more effectively prevented.

The total amount of the structural unit having a carboxyl group represented by the formula (3), (4), or (5) and the structural unit having an acetyl group represented by the formula (6) is preferably 0.2 to 35 mol %, more preferably 1 to 15 mol %.

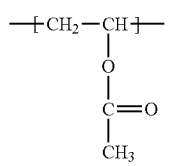

(6)

The lower limit of the degree of polymerization of the polyvinyl acetal resin is preferably 250, and the upper limit thereof is preferably 4,000. A polyvinyl acetal resin with the degree of polymerization of 250 or higher is industrially easy to obtain. When the degree of polymerization of the polyvinyl acetal resin is 4,000 or lower, the solution viscosity is lowered so that the active material can be sufficiently dispersed. The lower limit of the degree of polymerization is more preferably 280, and the upper limit thereof is more preferably 800.

The lower limit of the glass transition temperature of the polyvinyl acetal resin is preferably 70° C. and the upper limit thereof is preferably 100° C. With the glass transition temperature falling within the above range, the polyvinyl acetal resin is excellent in electrolyte resistance.

The polyvinyl acetal resin preferably has an anionic group.

The polyvinyl acetal resin containing the anionic group easily adheres to the surface of the active material to enhance the dispersibility of the active material.

Examples of the anionic group include a sulfuric acid group, a phosphonic acid group, a nitrile group, a phosphoric acid group, and a phosphoric acid ester group. The anionic group does not include a functional group having a carboxyl group.

The amount of the polyvinyl acetal resin in the composition for a lithium secondary battery electrode of the present invention is not particularly limited. The lower limit thereof is preferably 0.2% by weight, and the upper limit thereof is preferably 5% by weight. When the amount of the polyvinyl acetal resin is 0.2% by weight or more, the adhesion to a current collector is improved. When the amount of the polyvinyl acetal resin is 5% by weight or less, the discharge capacity of the lithium secondary battery can be improved. The amount of the polyvinyl acetal resin is more preferably 0.5 to 3% by weight.

The polyvinyl acetal resin is prepared by acetalizing polyvinyl alcohol with an aldehyde.

In particular, an exemplary method of producing the polyvinyl acetal resin includes preparing a polyvinyl alcohol having the structural unit having a carboxyl group, and acetalizing the polyvinyl alcohol. Another exemplary method includes acetalizing a polyvinyl alcohol not having the structural unit having a carboxyl group, and adding a portion which is to be the structural unit having a carboxyl group.

An exemplary method of producing a polyvinyl alcohol having the structural unit having a carboxyl group includes copolymerizing an allylcarboxylic acid such as allyl formate and allyl acetate with a vinyl ester such as vinyl acetate, and adding an acid or an alkali to a solution of the obtained copolymer in an alcohol for saponification.

An exemplary method of adding a portion corresponding to the structural unit having a carboxyl group includes reacting a polyvinyl alcohol not having the structural unit having a carboxyl group (hereafter, also simply referred to as polyvinyl alcohol) with allylcarboxylic acid, sodium allylcarboxylate, or the like.

The polyvinyl alcohol not having the structural unit having a carboxyl group (hereafter, also simply referred to as polyvinyl alcohol) is obtained, for example, by saponifying a copolymer of a vinyl ester and ethylene. Examples of the vinyl ester include vinyl formate, vinyl acetate, vinyl propionate, and vinyl pivalate. From the standpoint of the economic efficiency, preferred is vinyl acetate.

The polyvinyl alcohol may be copolymerized with an ethylenically unsaturated monomer within a range that the effect of the present invention is not impaired. The ethylenically unsaturated monomer is not limited, and examples thereof include acrylic acid, methacrylic acid, (anhydrous) phthalic acid, (anhydrous) maleic acid, (anhydrous) itaconic acid, acrylonitrile, methacrylonitrile, acrylamide, methacrylamide, trimethyl-(3-acrylamide-3-dimethylpropyl)-ammonium chloride, acrylamide-2-methylpropanesulfonic acid and its sodium salt, ethyl vinyl ether, butyl vinyl ether, N-vinyl pyrrolidone, vinyl chloride, vinyl bromide, vinyl fluoride, vinylidene chloride, vinylidene fluoride, tetrafluoroethylene, sodium vinylsulfonate, and sodium allylsulfonate. A terminal-modified polyvinyl alcohol obtained by copolymerizing a vinyl ester monomer such as vinyl acetate with ethylene in the presence of a thiol compound such as thiolacetic acid or mercaptopropionic acid, followed by saponification thereof, may also be used.

The polyvinyl alcohol may be prepared by saponifying a copolymer of the vinyl ester and an α-olefin. Moreover, the ethylenically unsaturated monomer may be further used in the copolymerization to provide a polyvinyl alcohol containing a component derived from an ethylenically unsaturated monomer. A terminal modified polyvinyl alcohol may also be used which is obtained by copolymerizing a vinyl ester monomer such as vinyl acetate with an α-olefin in the presence of a thiol compound such as thiolacetic acid or mercaptopropionic acid and saponifying the resulting product. The α-olefin is not limited, and examples thereof include methylene, ethylene, propylene, isopropylene, butylene, isobutylene, pentylene, hexylene, cyclohexylene, cyclohexyl ethylene, and cyclohexyl propylene.

The composition for a lithium secondary battery electrode of the present invention may further contain, in addition to the polyvinyl acetal resin, a polyvinylidene fluoride resin.

The use of the polyvinylidene fluoride resin in combination further improves the resistance against an electrolyte to improve the discharge capacity.

In the case where the polyvinylidene fluoride resin is contained in the composition, the weight ratio between the polyvinyl acetal resin and the polyvinylidene fluoride resin is preferably 0.5:9.5 to 7:3.

When the weight ratio is within such a range, the resistance against an electrolyte can be imparted, while the adhesion to a current collector which polyvinylidene fluoride remarkably lacks is maintained.

The weight ratio between the polyvinyl acetal resin and the polyvinylidene fluoride resin is more preferably 1:9 to 4:6.

The lower limit of the amount of the polyvinyl acetal resin in the composition for a lithium secondary battery electrode of the present invention is preferably 0.01 parts by weight, and the upper limit thereof is preferably 12 parts by weight relative to 100 parts by weight of the active material. When the amount of the polyvinyl acetal resin is 0.01 parts by weight or more, the adhesion to a current collector can be improved. When the amount of the polyvinyl acetal resin is 12 parts by weight or less, the discharge capacity of the lithium secondary battery can be improved. The lower limit of the polyvinyl acetal resin content is more preferably 0.5 parts by weight.

The entire amount of the binder in the composition for a lithium secondary battery electrode of the present invention is not limited. The lower limit thereof is preferably 1% by weight, and the upper limit thereof is preferably 30% by weight. When the amount of the binder is 1% by weight or more, the adhesion to a current collector can be improved. When the amount of the binder is 30% by weight or less, the discharge capacity of the lithium secondary battery can be improved.

The composition for a lithium secondary battery electrode of the present invention contains an organic solvent.

Any organic solvent may be used as long as it can dissolve the polyvinyl acetal resin therein. Examples thereof include cyclohexanone, methyl ethyl ketone, methyl isobutyl ketone, tetrahydrofuran, toluene, isopropyl alcohol, N-methylpyrrolidone, and ethanol. Preferred among these is N-methylpyrrolidone.

These organic solvents may be used alone, or in combination of two or more thereof.

The amount of the organic solvent in the composition for a lithium secondary battery electrode of the present invention is not limited. The lower limit thereof is preferably 20% by weight, and the upper limit thereof is preferably 50% by weight. When the amount of the organic solvent is 20% by weight or more, the viscosity of the paste is lowered to facilitate application of the paste. When the amount of the organic solvent is 50% by weight or less, development of unevenness after drying the solvent can be prevented. The lower limit is more preferably 25% by weight, and the upper limit is more preferably 40% by weight.

The composition for a lithium secondary battery electrode of the present invention may optionally contain, in addition to the active material, polyvinyl acetal resin, and organic solvent described above, additives such as a flame retardant auxiliary, a thickener, a defoamer, a leveling agent, and an adhesion imparting agent.

The composition for a lithium secondary battery electrode of the present invention may be produced by any method, and an exemplary method includes mixing the active material, polyvinyl acetal resin, organic solvent, and optionally added additives with any mixer such as a ball mill, a blender mill, or a triple roll mill.

The composition for a lithium secondary battery electrode of the present invention is formed into an electrode by application thereof to a conductive substrate, followed by drying.

A lithium secondary battery including the composition for a lithium secondary battery electrode of the present invention is also encompassed by the present invention.

Various means may be employed for application of the composition for a lithium secondary battery electrode of the present invention to a conductive substrate, such as an extrusion coater, a reverse roller, a doctor blade, or an applicator.

Advantageous Effects of Invention

The present invention can provide a composition for a lithium secondary battery electrode which is excellent in dispersibility of an active material and adhesiveness, capable of maintaining an appropriate viscosity for a long period of time, and capable of providing a high-capacity lithium secondary battery even when the amount of a binder is small.

In the case where the composition is used as an electrode material of a lithium secondary battery, the resin binds to a conductive material such as an active material and a conductive aid by point contact to provide an electrode with a low volume resistivity and small interface resistance. As a result, the battery capacity and cycle characteristics of the lithium secondary battery to be obtained are improved.

Moreover, improvement of the solvent resistance reduces electrode defect after production of a battery, improving the battery capacity and cycle characteristics of the lithium secondary battery to be obtained.

DESCRIPTION OF EMBODIMENTS

The present invention is more specifically described in the following with reference to, but not limited to, examples.
(Synthesis of Polyvinyl Acetal Resin A)

An amount of 350 parts by weight of carboxyl group-containing a polyvinyl alcohol A having a structural unit having a carboxyl group represented by the formula (3) (degree of polymerization: 800, degree of saponification: 98 mol %, amount of structural unit having a carboxyl group represented by the formula (3) (carboxyl-containing group content): 5 mol %, $R^2$: $CH_2$, X: H) was added to 3000 parts by weight of pure water, and dissolved with stirring at 90° C. for about two hours. After cooling to 40° C., to the resulting solution was added 230 parts by weight of hydrochloric acid having a concentration of 35% by weight. The temperature of the solution was further lowered to 5° C., and the solution was blended with 50 parts by weight of n-butyraldehyde. The resulting solution was subjected to acetalization while the temperature was maintained at 5° C. for precipitation of a reaction product. Then, the solution was maintained to have a temperature of 30° C. for three hours for completion of the reaction. The solution was then subjected to neutralization by a known method, washing with water, and drying to give polyvinyl acetal resin A in the form of white powder.

The obtained polyvinyl acetal resin A was dissolved in DMSO-$d_6$ (dimethyl sulfoxide) and the following parameters were measured by $^{13}$C-NMR (nuclear magnetic resonance spectrum): the amount of a structural unit represented by the formula (1) [hydroxyl group content]; the amount of a structural unit represented by the formula (2) [degree of acetalization]; the amount of a structural unit having a carboxyl group represented by the formula (3) [carboxyl-containing group content]; and the amount of the structural unit represented by the formula (6) [acetyl group content]. The hydroxyl group content was 45 mol %, the degree of acetalization (degree of butyralization) was 48 mol %, the carboxyl-containing group content was 5 mol %, and the acetyl group content was 2 mol %.

The glass transition temperature (Tg) of the obtained polyvinyl acetal resin A was measured with a differential scanning calorimeter (DSC6220 available from Seiko Instruments Inc.).
(Synthesis of Polyvinyl Acetal Resins B to K, P, and Q)

Polyvinyl acetal resins B to K, P, and Q were synthesized in the same manner as in the case of the polyvinyl acetal resin A, except that a polyvinyl alcohol (type) and an aldehyde (type, amount) as shown in Table 1 were used. A polyvinyl alcohol not having a carboxyl group was used as a polyvinyl alcohol K.

(Synthesis of Polyvinyl Acetal Resin L).

A polyvinyl acetal resin L was synthesized in the same manner as in the case of the polyvinyl acetal resin A, except that the carboxyl group-containing polyvinyl alcohol A having a structural unit having a carboxyl group represented by the formula (3) was changed to a carboxyl group-containing polyvinyl alcohol L having a structural unit having a carboxyl group represented by the formula (4) (degree of polymerization: 400, degree of saponification: 98 mol %, amount of the structural unit having a carboxyl group represented by formula (4) [carboxyl-containing group content]: 5 mol %, $R^3$: $CH_2$, $R^4$: single bond) and an aldehyde (type, amount) as shown in Table 1 was used.

(Synthesis of Polyvinyl Acetal Resin M)

A polyvinyl acetal resin M was synthesized in the same manner as in the case of the polyvinyl acetal resin A, except that the carboxyl group-containing polyvinyl alcohol A having a structural unit having a carboxyl group represented by the formula (3) was changed to a carboxyl group-containing polyvinyl alcohol M having a structural unit having a carboxyl group represented by the formula (4) (degree of polymerization: 600, degree of saponification: 95 mol %, amount of the structural unit having a carboxyl group represented by formula (4) [carboxyl-containing group content]: 3 mol %, $R^3$: $CH_2$, $R^4$: $C_6H_4$) and an aldehyde (type, amount) as shown in Table 1 was used.

(Synthesis of Polyvinyl Acetal Resin N)

A polyvinyl acetal resin N was synthesized in the same manner as in the case of the polyvinyl acetal resin A, except that the carboxyl group-containing polyvinyl alcohol A having a structural unit having a carboxyl group represented by the formula (3) was changed to a carboxyl group-containing polyvinyl alcohol N having a structural unit having a carboxyl group represented by the formula (5) (degree of polymerization: 400, degree of saponification: 95 mol %, amount of the structural unit having a carboxyl group represented by formula (5) [carboxyl-containing group content]: 3 mol %, $R^5$: $CH_2$, $R^6$: single bond) and an aldehyde (type, amount) as shown in Table 1 was used.

(Synthesis of Polyvinyl Acetal Resin O)

A polyvinyl acetal resin O was synthesized in the same manner as in the case of the polyvinyl acetal resin A, except that the carboxyl group-containing polyvinyl alcohol A having a structural unit having a carboxyl group represented by the formula (3) was changed to a carboxyl group-containing polyvinyl alcohol O having a structural unit having a carboxyl group represented by the formula (5) (degree of polymerization: 800, degree of saponification: 95 mol %, amount of structural unit having a carboxyl group represented by formula (5) [carboxyl-containing group content]: 1 mol %, $R^5$: $CH_2$, $R^6$: $CH=CH$) and an aldehyde (type, amount) as shown in Table 1 was used.

(Synthesis of Polyvinyl Acetal Resin R)

A polyvinyl acetal resin R was synthesized in the same manner as in the case of the polyvinyl acetal resin A, except that the carboxyl group-containing polyvinyl alcohol A having a structural unit having a carboxyl group represented by the formula (3) was changed to a sulfonic acid group-containing polyvinyl alcohol R having a structural unit having a sulfonic acid group (degree of polymerization: 800, degree of saponification: 97 mol %, amount of the structural unit having a sulfonic acid group [sulfonic acid group content]: 3 mol %, structural unit represented by formula (3) in which a part corresponding to a carboxyl group is replaced with sulfonic acid group, $R^2$: $CH_2$) and an aldehyde (type, amount) as shown in Table 1 was used.

TABLE 1

| | Polyvinyl alcohol | | | | | | | |
|---|---|---|---|---|---|---|---|---|
| Resin type | Degree of polymerization | Degree of saponification (mol %) | $R^2$ structure | $R^3$ structure | $R^4$ structure | $R^5$ structure | $R^6$ structure | Type of acid-modified group |
| A | 800 | 98 | $CH_2$ | — | — | — | — | Carboxyl |
| B | 600 | 99 | $CH_2$ | — | — | — | — | Carboxyl |
| C | 1400 | 95 | $CH_2$ | — | — | — | — | Carboxyl |
| D | 1700 | 95 | $CH=CH$ | — | — | — | — | Carboxyl |
| E | 3300 | 95 | $C_6H_4$ | — | — | — | — | Carboxyl |
| F | 250 | 95 | $CH_2$ | — | — | — | — | Carboxyl |
| G | 4000 | 70 | $CH_2$ | — | — | — | — | Carboxyl |
| H | 900 | 95 | $CH_2$ | — | — | — | — | Carboxyl |
| I | 1300 | 95 | $CH_2$ | — | — | — | — | Carboxyl |
| J | 800 | 95 | $CH_2$ | — | — | — | — | Carboxyl |
| K | 800 | 95 | — | — | — | — | — | — |
| L | 400 | 98 | — | $CH_2$ | Single bond | — | — | Carboxyl |
| M | 600 | 95 | — | $CH_2$ | $C_6H_4$ | — | — | Carboxyl |
| N | 400 | 95 | — | — | — | $CH_2$ | Single bond | Carboxyl |
| O | 800 | 95 | — | — | — | $CH_2$ | $CH=CH$ | Carboxyl |
| P | 800 | 99 | $CH_2$ | — | — | — | — | Carboxyl |
| Q | 800 | 98 | $CH_2$ | — | — | — | — | Carboxyl |
| R | 800 | 97 | $CH_2$ | — | — | — | — | Sulfonic acid |

| | Polyvinyl alcohol | Aldehyde | | Polyvinyl acetal | | | |
|---|---|---|---|---|---|---|---|
| Resin type | Acid-modified group content[*1] (mol %) | Type | Amount (parts by weight) | Hydroxyl group content (mol %) | Degree of acetalization (mol %) | Acetyl group content (mol %) | Carboxyl-containing group content[*1] (mol %) | Tg (° C.) |
| A | 5 | Butylaldehyde | 50 | 45 | 48 | 2 | 5 | 74 |
| B | 3 | Butylaldehyde | 4 | 94 | 2 | 1 | 3 | — |
| C | 0.1 | Butylaldehyde | 47 | 50 | 44.9 | 5 | 0.1 | 72 |
| D | 3 | Butylaldehyde | 39 | 55 | 37 | 5 | 3 | 76 |

TABLE 1-continued

| | | | | | | | | |
|---|---|---|---|---|---|---|---|---|
| E | 3 | Butylaldehyde | 34 | 60 | 32 | 5 | 3 | 78 |
| F | 3 | Benzaldehyde | 24 | 70 | 22 | 5 | 3 | — |
| G | 3 | Propionaldehyde | 24 | 45 | 22 | 30 | 3 | — |
| H | 0.01 | Acetaldehyde | 12 | 85 | 9.99 | 5 | 0.01 | — |
| I | 3 | Vinylaldehyde | 14 | 80 | 12 | 5 | 3 | — |
| J | 3 | Butylaldehyde | 54 | 40 | 52 | 5 | 3 | 70 |
| K | 0 | Butylaldehyde | 37 | 60 | 35 | 5 | 0 | 76 |
| L | 5 | Butylaldehyde | 45 | 50 | 43 | 2 | 5 | 77 |
| M | 3 | Butylaldehyde | 39 | 55 | 37 | 5 | 3 | 75 |
| N | 3 | Butylaldehyde | 34 | 60 | 32 | 5 | 3 | 76 |
| O | 1 | Butylaldehyde | 21 | 75 | 19 | 5 | 1 | 67 |
| P | 2 | Butylaldehyde | 98 | 96 | 1 | 1 | 2 | — |
| Q | 3 | Butylaldehyde | 45 | 43 | 52 | 2 | 3 | 75 |
| R | 3 | Butylaldehyde | 62 | 60 | 34 | 3 | 0 | — |

*[1]The acid-modified group content and the carboxyl-containing group content each refer to the amount of a structural unit having its modified group

Example 1

(Preparation of Composition for Lithium Secondary Battery Electrode)

To 20 parts by weight of a resin solution containing the obtained polyvinyl acetal resin A (polyvinyl acetal resin: 2.5 parts by weight) were added 50 parts by weight of lithium cobaltate (CELLSEED C-5H available from Nippon Chemical Industrial Co., Ltd.) as an active material, 5 parts by weight of acetylene black (DENKA BLACK from Denki Kagaku Kogyo Kabushiki Kaisha) as a conductivity imparting agent, and 26 parts by weight of N-methylpyrrolidone, and they were mixed using a THINKY MIXER available from THINKY CORPORATION to prepare a composition for a lithium secondary battery electrode.

Examples 2 to 14, Comparative Examples 1 to 5

Compositions for a lithium secondary battery electrode were each obtained in the same manner as in Example 1, except that the polyvinyl acetal resin (resin type, amount) as shown in Table 2 was used.

<Evaluation>

The compositions for a lithium secondary battery electrode obtained in the examples and comparative examples were evaluated for the following parameters. Table 2 shows the results.

(1) Adhesiveness (Peeling Force)

Evaluation of the adhesion to aluminum foil was performed on the compositions for a lithium secondary battery electrode obtained in the examples and comparative examples.

Each of the compositions for an electrode was applied to aluminum foil (thickness: 20 μm) to the thickness after drying of 20 μm, and dried to prepare a test sample in which a sheet-like electrode was formed on aluminum foil.

A piece in a size of 1 cm in length and 2 cm in width was cut out from the sample. The sample piece was immobilized using an AUTOGRAPH ("AGS-J" available from Shimadzu Corporation) and the electrode sheet was pulled up for measurement of the peeling force (N) needed for completely peeling the electrode sheet from the aluminum foil. The adhesiveness of each composition was evaluated based on the following criteria.

○ (Good): Peeling force of higher than 8.0 N.
Δ (Average): Peeling force of 5.0 to 8.0 N.
x (Poor): Peeling force of lower than 5.0 N.

(2) Dispersibility (Surface Roughness)

Using the test sample in "(1) Adhesiveness", the surface roughness Ra was measured in conformity with JIS B 0601 (1994). The surface roughness of the electrode was evaluated based on the following criteria. Commonly, when the dispersibility of the active material is higher, the surface roughness is said to be smaller.

○○ (Excellent): Ra of less than 2 μm.
○ (Good): Ra of 2 μm or more but less than 5 μm.
Δ (Average): Ra of 5 μm or more but less than 8 μm.
x (Poor): Ra of 8 μm or more.

(3) Solvent Solubility (Production of Electrode Sheet)

Onto a polyethylene terephthalate (PET) film preliminarily subjected to release treatment was applied each of the compositions for a lithium secondary battery electrode obtained in the examples and comparative examples to the thickness after drying of 20 μm, and dried to give an electrode sheet.

A 2-cm-square piece was cut out from the electrode sheet to prepare an electrode sheet sample.

(Evaluation of Elution)

The obtained sample was accurately weighed, and the weight of the resin contained in the sample was calculated based on the weight ratio of the components contained in the sheet. Then, the sample was placed in a mesh bag, and the total weight of the mesh bag and the sample was accurately measured.

The mesh bag containing the sample was immersed in a solvent mixture (diethyl carbonate:ethylene carbonate=1:1) which is an electrolyte solvent and left to stand at 60° C. for 5 hours. After the standing, the mesh bag was taken out and dried under the conditions of 150° C. and 8 hours, thereby completely vaporizing the solvent.

The mesh bag was taken out from the dryer, left to stand at room temperature for one hour, and weighed. The elution amount of the resin was calculated based on the weight change before and after the test, and the elution rate of the resin was calculated based on the ratio between the elution amount and the preliminarily calculated weight of the resin. The obtained elution rate was evaluated based on the following criteria.

○ (Good): Elution rate of lower than 1%
Δ (Average): Elution rate of 1% or higher but lower than 2%
x (Poor): Elution rate of 2% or higher (4) Viscosity Stability Over Time The paste viscosity of each of the compositions for a lithium secondary battery electrode obtained in the examples and comparative examples was measured using a Brookfield viscometer. The viscosity was measured on the day the paste was produced and a week after that day. The change rate of the viscosity over time was evaluated based on the following criteria. Commonly, when the viscosity stability is higher, the change rate of the viscosity over time is said to be smaller.

○○ (Excellent): The change rate of viscosity over time of 30% or lower
○ (Good): The change rate of viscosity over time of higher than 30% but not higher than 50%
Δ (Average): The change rate of viscosity over time of higher than 50% but not higher than 80%
x (Poor): The change rate of viscosity over time of higher than 80%

(5) Evaluation of Electrode Resistance

The volume resistance rate and interface resistance of the test sample electrode obtained in "(1) Adhesiveness" were measured with an electrode resistance meter (Hioki E.E. Corp.).

(6) Evaluation of Battery Performance (a) Production of Coin Battery

The composition for a lithium secondary battery positive electrode obtained in Example 1 was applied to aluminum foil and dried to form a layer with a thickness of 0.2 mm. A φ 12-mm piece was punched out from the resulting layer to prepare a positive electrode layer.

Separately, a φ12-mm piece was punched out from a purchased negative electrode sheet for a lithium secondary battery (A100 available from Hohsen Corp.) to prepare a negative electrode layer. The electrolyte used was a mixed solution with ethylene carbonate containing $LiPF_6$ (1M). The positive electrode layer was impregnated with the electrolyte and then placed on a positive electrode current collector. A porous PP film (separator) with a thickness of 25 mm impregnated with the electrolyte was further placed thereon.

A lithium metal plate serving as a negative electrode layer was further placed thereon, and a negative electrode current collector covered with an insulating packing was placed on the top. The resulting laminate was pressurized using a caulking machine to provide a sealed coin battery.

(b) Evaluation of Discharge Capacity and Charge/Discharge Cycle

Evaluation of the discharge capacity and charge/discharge cycle was performed on the obtained coin batteries using a charge/discharge tester available from Hohsen Corp. The evaluation of the discharge capacity and charge/discharge cycle was performed under the conditions of the voltage range of 3.0 to 4.4 V and the evaluation temperature of 20° C.

TABLE 2

| | Composition for lithium secondary battery electrode | | | | Evaluation | | | |
| | Active material (Parts by weight) | Polyviny acetal | | | Adhesiveness | | Dispersibility | |
| | | Resin type | Amount (parts by weight) | Amount per 100 parts by weight of active material (parts by weight) | Peeling force (N) | Judgement | Surface roughness Ra (μm) | Judgement |
|---|---|---|---|---|---|---|---|---|
| Example 1 | 50 | A | 2.5 | 5 | 8.9 | ○ | 1.8 | ○○ |
| Example 2 | 50 | B | 0.005 | 0.01 | 6.4 | Δ | 2.6 | ○ |
| Example 3 | 50 | C | 10 | 20 | 13.5 | ○ | 1.4 | ○○ |
| Example 4 | 50 | D | 2.5 | 5 | 9.6 | ○ | 2.0 | ○ |
| Example 5 | 50 | E | 2.5 | 5 | 12.4 | ○ | 4.2 | ○ |
| Example 6 | 50 | F | 2.5 | 5 | 7.6 | Δ | 2.2 | ○ |
| Example 7 | 50 | G | 2.5 | 5 | 10.1 | ○ | 4.7 | ○ |
| Example 8 | 50 | H | 2.5 | 5 | 8.7 | ○ | 1.7 | ○○ |
| Example 9 | 50 | I | 2.5 | 5 | 8.2 | ○ | 2.0 | ○ |
| Example 10 | 50 | A | 6 | 12 | 11.9 | ○ | 1.6 | ○○ |
| Example 11 | 50 | L | 2.5 | 5 | 10.3 | ○ | 1.9 | ○○ |
| Example 12 | 50 | M | 2.5 | 5 | 9.8 | ○ | 2.4 | ○ |
| Example 13 | 50 | N | 5 | 10 | 12.7 | ○ | 1.5 | ○○ |
| Example 14 | 50 | O | 4 | 8 | 10.9 | ○ | 1.7 | ○○ |
| Comparative Example 1 | 50 | J | 2.5 | 5 | 7.0 | Δ | 2.1 | ○ |
| Comparative Example 2 | 50 | K | 2.5 | 5 | 9.1 | ○ | 5.0 | Δ |
| Comparative Example 3 | 50 | P | 2.5 | 5 | 4.7 | x | 2.4 | ○ |
| Comparative Example 4 | 50 | Q | 2.5 | 5 | 11.0 | ○ | 1.8 | ○○ |
| Comparative Example 5 | 50 | R | 2.5 | 5 | 8.2 | ○ | 5.9 | Δ |

| | Evaluation | | | | | | |
| | Solvent solubility Judgement | Stability of viscosity over time | | Electrode resistance | | Battery performance | |
| | | Change rate of viscosity over time (%) | Judgement | Volume resistance (Ωcm) | Interface resistance (Ωcm²) | Discharge capacity (mAh/g) | Charge/discharge cycle (%) |
|---|---|---|---|---|---|---|---|
| Example 1 | ○ | 23 | ○○ | 3.42 | 0.59 | 162 | 98 |
| Example 2 | ○ | 30 | ○○ | 3.24 | 0.42 | 140 | 98 |
| Example 3 | Δ | 32 | ○ | 5.00 | 1.10 | 115 | 92 |
| Example 4 | ○ | 29 | ○○ | 3.35 | 1.27 | 131 | 95 |
| Example 5 | ○ | 19 | ○○ | 3.79 | 2.24 | 125 | 96 |
| Example 6 | ○ | 39 | ○ | 4.21 | 0.66 | 147 | 94 |
| Example 7 | ○ | 24 | ○○ | 4.80 | 3.68 | 146 | 93 |
| Example 8 | ○ | 42 | ○ | 4.62 | 0.70 | 153 | 92 |

TABLE 2-continued

| | | | | | | | | |
|---|---|---|---|---|---|---|---|---|
| Example 9 | ○ | 27 | ○○ | 4.75 | 1.09 | 130 | 90 |
| Example 10 | Δ | 19 | ○○ | 4.97 | 0.62 | 108 | 94 |
| Example 11 | ○ | 31 | ○ | 3.93 | 2.84 | 119 | 98 |
| Example 12 | Δ | 35 | ○ | 3.84 | 2.93 | 114 | 91 |
| Example 13 | ○ | 33 | ○ | 4.83 | 2.78 | 127 | 94 |
| Example 14 | ○ | 39 | ○ | 436 | 1.84 | 121 | 93 |
| Comparative Example 1 | x | 20 | ○○ | 5.99 | 3.21 | 62 | 73 |
| Comparative Example 2 | x | 52 | Δ | 6.38 | 3.45 | 25 | 69 |
| Comparative Example 3 | ○ | 81 | x | 7.24 | 4.32 | 20 | 64 |
| Comparative Example 4 | x | 28 | ○○ | 4.02 | 3.04 | 87 | 80 |
| Comparative Example 5 | ○ | 86 | x | 3.87 | 4.24 | 100 | 89 |

INDUSTRIAL APPLICABILITY

The present invention provides a composition for a lithium secondary battery electrode which is excellent in dispersibility of an active material and adhesiveness, capable of maintaining an appropriate viscosity for a long period of time, and capable of providing a high-capacity lithium secondary battery even when the amount of a binder is small.

The invention claimed is:

1. A composition for a lithium secondary battery electrode comprising:
   an active material;
   a polyvinyl acetal resin; and
   an organic solvent,
   the polyvinyl acetal resin having a structural unit having a hydroxyl group of the following formula (1), a structural unit having an acetal group of the following formula (2), and a structural unit having a carboxyl group,
   the polyvinyl acetal resin containing 0.01 to 5 mol % of the structural unit having the carboxyl group and 45 to 95 mol % of the structural unit having the hydroxyl group of the following formula (1):

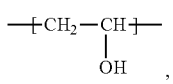  (1)

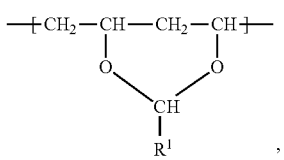  (2)

where $R^1$ represents a hydrogen atom or a C1-C20 alkyl group.

2. The composition for a lithium secondary battery electrode according to claim 1,
   wherein the structural unit having the carboxyl group includes at least one member selected from the group consisting of a structural unit having a carboxyl group of the following formulae formula (3), a structural unit having a carboxyl group of the following formula (4), and a structural unit having a carboxyl group of the following formula (5):

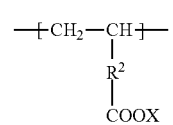  (3)

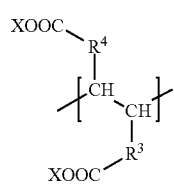  (4)

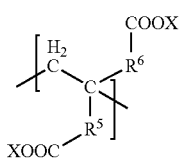  (5)

where $R^2$, $R^3$, $R^4$, $R^5$, and $R^6$ each represent a single bond or a C1-C10 saturated or unsaturated hydrocarbon, and X represents hydrogen, sodium, or potassium.

3. The composition for a lithium secondary battery electrode according to claim 2, wherein the polyvinyl acetal resin has a degree of polymerization of 250 to 4,000.

4. The composition for a lithium secondary battery electrode according to claim 2,
   wherein the polyvinyl acetal resin is contained in an amount of 0.01 to 12 parts by weight relative to 100 parts by weight of the active material.

5. The composition for a lithium secondary battery electrode according to claim 2, further comprising a conductivity imparting agent.

6. A lithium secondary battery comprising the composition for a lithium secondary battery electrode according to claim 2.

7. The composition for a lithium secondary battery electrode according to claim 1,
   wherein the polyvinyl acetal resin has a degree of polymerization of 250 to 4,000.

8. The composition for a lithium secondary battery electrode according to claim 7,
   wherein the polyvinyl acetal resin is contained in an amount of 0.01 to 12 parts by weight relative to 100 parts by weight of the active material.

9. The composition for a lithium secondary battery electrode according to claim 7, further comprising a conductivity imparting agent.

10. A lithium secondary battery comprising the composition for a lithium secondary battery electrode according to claim 7.

11. The composition for a lithium secondary battery electrode according to claim 1,
wherein the polyvinyl acetal resin is contained in an amount of 0.01 to 12 parts by weight relative to 100 parts by weight of the active material.

12. The composition for a lithium secondary battery electrode according to claim 11, further comprising a conductivity imparting agent.

13. A lithium secondary battery comprising the composition for a lithium secondary battery electrode according to claim 11.

14. The composition for a lithium secondary battery electrode according to claim 1, further comprising a conductivity imparting agent.

15. A lithium secondary battery comprising the composition for a lithium secondary battery electrode according to claim 14.

16. A lithium secondary battery comprising the composition for a lithium secondary battery electrode according to claim 1.

* * * * *